Dec. 19, 1961 W. F. MANNING 3,013,802

SPINDLES FOR RECORD CHANGING GRAMOPHONES AND THE LIKE

Filed Sept. 9, 1957

INVENTOR
Walter Frederick Manning
by [signature]
his Attorney

United States Patent Office 3,013,802
Patented Dec. 19, 1961

3,013,802

SPINDLES FOR RECORD CHANGING GRAMOPHONES AND THE LIKE

Walter Frederick Manning, Swindon, England, assignor to The Garrard Engineering & Manufacturing Company Limited, Swindon, England Filed Sept. 9, 1957, Ser. No. 682,779
3 Claims. (Cl. 274—10)

Figures 1, 2:
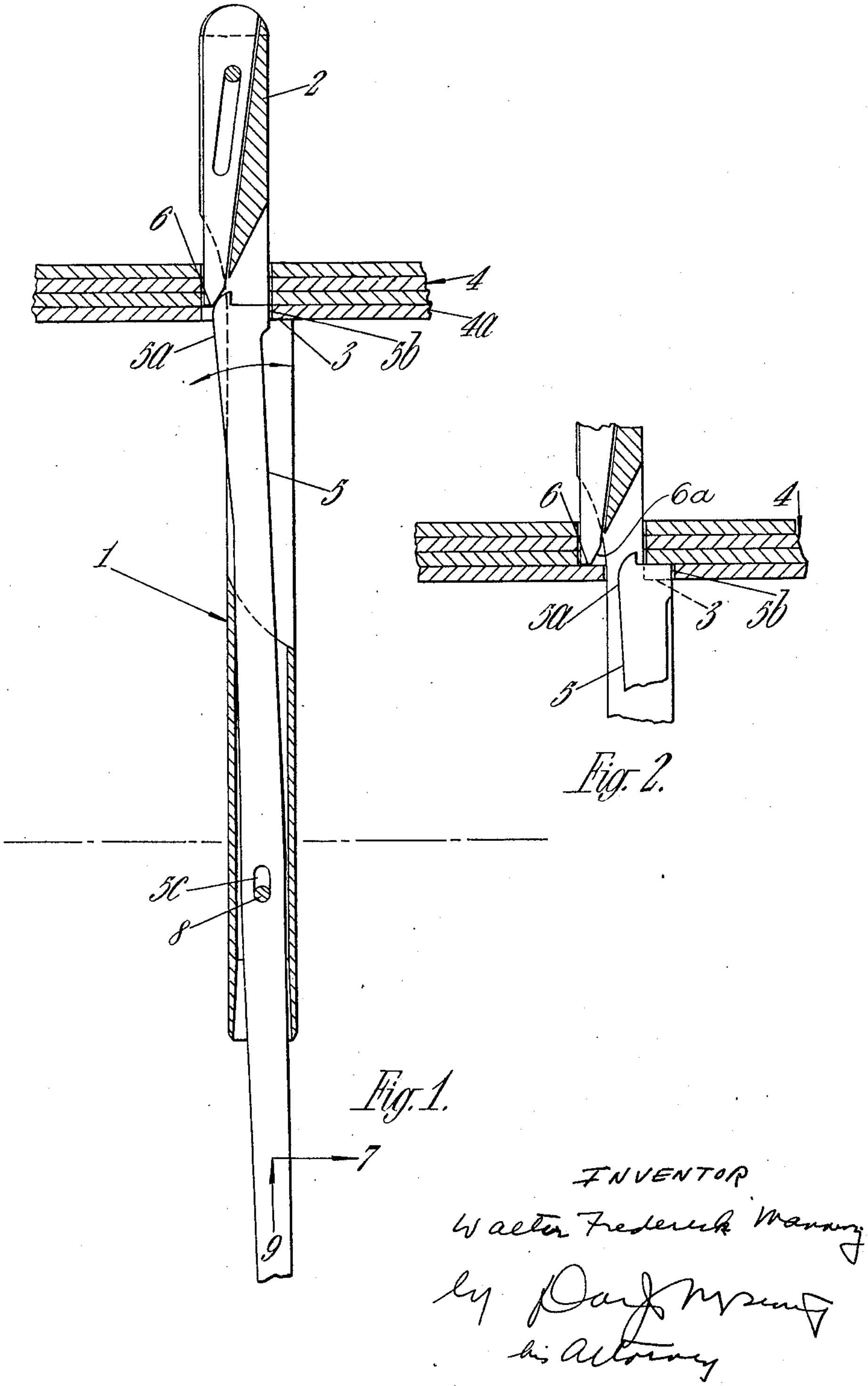

This invention relates to record changing phonographs and more particularly to the mechanism for releasing records from the bottom of a stack for delivery to a turntable wherein the stack is supported at its centre by means of a spindle or post of the type having an offset top portion providing a supporting shoulder for the records, a thrustor member being provided internally of the spindle to push the lowermost or last record of the stack off the shoulder for record changing purposes.

In record supporting spindles of the type indicated it is desirable that some means be provided to prevent the lowermost record of the stack from becoming misplaced so that it comes off the shoulder and falls down the spindle to the turntable before proper operation of the thrustor means. Where, however, a record-changing phonograph is adapted to allow manual placing of a record on the turntable by passing the record over the fixed spindle, it is equally desirable to avoid restricting or complicating this operation due to difficulties in manipulating the record past the stack-support shoulder.

It is an object of the present invention to provide an improved form of turntable spindle or post for record-changing phonographs, of the type indicated, which meets the opposing requirements described above by sufficiently restricting the lowermost record of a stack from being accidentally misplaced off the spindle shoulder while permiting a single record to be manually passed over the spindle shoulder and on to the turntable without hindrance.

It is a further object of the present invention to provide an improved form of turntable spindle or post according to the preceding paragraph, which permits ready removal of a record or stack of records from the turntable without removal of the spindle or post by sliding them up the spindle or post past the shoulder thereon.

The invention consists in a turntable spindle or post of the type indicated for a record changing phonograph, wherein the thrustor member is provided with a projecting portion which normally prevents a record or the lowermost record of a stack on the offset top portion of the spindle or post and on the shoulder from being accidentally shifted to a position co-axial with the spindle or post and off the shoulder, but which under manually applied lateral pressure on a record for manual feeding past the shoulder (i.e. to the turntable) causes the thrustor to pivot to enable the record to be centralised on the spindle or post and displaced off the shoulder.

The invention further consists in a turntable spindle or post according to the preceding paragraph, wherein said projecting portion comprises a fillet or extension located adjacent the level of the shoulder on the edge of the thrustor member remote from the edge which contacts the records to push them off the shoulder.

The invention, as set out above, may be applied to turntable spindles or posts in which the offset top is plain, that is, has an integrally formed opposite and reverse (downwardly facing) shoulder on the opposite side of the spindle or post to the stack-supporting shoulder, or in which the offset top carries one or more sliding latches in known manner, the lower edge or edges of which comprise in effect the opposite and reverse (downwardly facing) shoulder.

In the accompanying drawings:

FIGURE 1 is a fragmentary elevational section of a turntable spindle or post according to the present invention showing the thrustor in its normal position, and FIGURE 2 shows a portion of FIGURE 1 with the thrustor in its operated position.

In carrying the invention into effect according to one convenient mode by way of example as shown in FIGURE 1, a turntable spindle or post for record changing phonographs comprises a vertically disposed spindle or post shown generally at 1 having an offset top portion 2 providing a shoulder 3 for supporting a stack of records 4 above a turntable (not shown), a thrustor member 5 being mounted internally of the spindle 1 on a pivot 8 and having an operative edge **5*b* to push the lowermost record 4*a* of the stack 4** off the shoulder for record changing purposes in conventional manner as shown in FIGURE 2.

The thrustor member 5 also in conventional manner is spring loaded in the vertical direction 9 by means not shown and by reason of slot **5*c* at its pivot 8** may perform small vertical movements such that the thrustor may be moved downwardly after displacing a record from the shoulder to facilitate the return movement of the upper end of the thrustor which may otherwise be impeded by the weight of the record stack.

The thrustor member 5 is provided with a fillet or extension **5*a*, adjacent the level of the shoulder 3 on its edge remote from the edge 5*b* which contacts the records to push them off the shoulder 3, the fillet or extension 5*a* extending to a point above the lowermost (downwardly facing) portion of the opposite and reverse shoulder created by the lower edge 6*a* of a latch 6 which is carried by the offset top portion 2 of the spindle 1 and adapted to slide in a generally vertical direction in known manner to facilitate record removal from the turntable. The thrustor is also spring loaded (not shown) in the horizontal direction shown by arrow 7 to cause the fillet or extension 5*a* to normally project from the spindle surface oppositely to the shoulder 3 to prevent the lowermost record being accidentally shifted to a position co-axial with the spindle or post 1 with consequent accidental delivery off the shoulder 3, while also permitting a single record to be manually loaded onto the turntable by moving the record laterally so that it presses against the fillet or extension 5*a* of the thrustor 5 so that the latter is pivoted about its pivot 8 against its spring loading, to enable the record to be centralised on the spindle or post and displaced off the shoulder 3**.

Alternatively, but not shown, the invention may be applied to a turntable spindle or post in which the offset top is plain, that is, has an integrally formed opposite and reverse (downwardly facing) shoulder on the opposite side of the spindle or post to the stack-supporting shoulder.

I claim:

1. In a record changer having a vertical spindle with a laterally off-set upper portion and a lower portion, a record shelf between the upper and lower portions of the spindle, and a slot extending longitudinally of the spindle; a relatively elongated thrustor lever mounted in said slot for relatively limited pivotal and slidable movement relative to said spindle; means biasing said lever to its upper limit of movement; said lever having a head formed with an upper edge positioned above said shelf at the upper limit of movement of said lever and with an operative lateral edge engageable with a record supported on said shelf; said operative lateral edge normally being aligned with the corresponding edge of the upper portion of the spindle in the retracted pivotal position of said lever and, upon swinging of said lever during a record changing movement, moving the supported record laterally of the shelf into axial alignment with the lower portion of the spindle for movement downward therealong onto a turntable; said upper edge, during such swinging of the lever, moving beneath the next record on the upper portion of said spindle to support the next record while the record initially supported on the shelf is displaced to move downwardly along the lower portion of said spindle; said head portion having an opposite lateral edge normally projecting laterally beyond said slot to obstruct movement of the supported record off said shelf in the retracted position of said lever; spring means biasing said lever to pivot to the retracted position; said spring means providing for swinging of said lever from the retracted position under manual pressure applied to the supported record to move the latter manually off said shelf; and a latch slidably and pivotally mounted in a slot in the upper portion of said spindle for sliding movement at a very small angle to the axis of said spindle; the lower edge of said latch, at the limit of its relative downward movement, being slightly above the upper surface of the record supported on said shelf; and said latch engaging the records above that supported on said shelf to prevent lateral movement thereof during movement of the record supported on the shelf laterally into axial alignment with the lower portion of the spindle; said lever, when the record next above the record supported on said shelf is resting on said upper edge, moving downwardly against its upward bias to lower such next record onto said shelf, and said spring means then biasing said lever to pivot to the retracted position.

2. In a record changer as claimed in claim 1, wherein the opposite lateral edge of said head extends above the supported record.

3. In a record changer as claimed in claim 1, wherein the opposite lateral edge of said head extends above the supported record and is curved longitudinally of said lever.

References Cited in the file of this patent

UNITED STATES PATENTS

| | | |
|---|---|---|
| 2,621,932 | Knox | Dec. 16, 1952 |

FOREIGN PATENTS

| | | |
|---|---|---|
| 696,606 | Great Britain | Sept. 2, 1953 |
| 1,077,741 | France | Nov. 10, 1954 |
| 1,084,344 | France | Jan. 18, 1955 |
| 545,757 | Italy | July 5, 1956 |